United States Patent [19]

Braat

[11] Patent Number: 5,026,149
[45] Date of Patent: Jun. 25, 1991

[54] PROJECTION LENS SYSTEM

[75] Inventor: Josephus J. M. Braat, Eindhoven, Netherlands

[73] Assignee: U.S. Philips Corporation, New York, N.Y.

[21] Appl. No.: 9,443

[22] Filed: Feb. 2, 1987

[30] Foreign Application Priority Data

Nov. 24, 1986 [NL] Netherlands .......................... 8602974

[51] Int. Cl.[5] .............................................. G02B 13/18
[52] U.S. Cl. ..................................... 350/432; 350/412
[58] Field of Search ................................ 350/432, 412

[56] References Cited

U.S. PATENT DOCUMENTS 4,526,442 7/1985 Betensky et al. .................... 350/412
4,592,627 6/1986 Smid ..................................... 350/432

Primary Examiner—Bruce Y. Arnold
Assistant Examiner—Rebecca D. Gass
Attorney, Agent, or Firm—Bernard Tiegerman

[57] ABSTRACT

A projection lens system for projecting a magnified image from an image source (3, 4, 5) on a projection screen (10) comprises from the image end successively a first, positive lens group ($L_1$) and at least a second, negative lens group ($L_3$) whose surface ($S_6$) facing the image end is concave. The first lens group consists of a single lens element ($L_1$) which in addition to a first refractive surface ($S_1$) facing the image end and a second refractive surface ($S_2$) facing the object end has a third radiation-reflecting surface ($S_3$) which is located between the first and the second surface.

10 Claims, 4 Drawing Sheets

PROJECTION LENS SYSTEM

BACKGROUND OF THE INVENTION

The invention relates to a projection lens system for projecting in an image space an image from an image source present in an object space. The lens system comprises from the image end successively a first, positive lens group and at least a second, negative lens group whose surface facing the image end is concave.

The image source may be in the form of a cathode ray tube or a light source and an electronically controllable flat display device built up of a matrix of picture cells which, dependent on the control signal, reflect or absorb light and pass or absorb light, respectively. Instead of being absorbed, the light may also be dispersed.

A projection lens system of this type is known from U.S. Pat. No. 4,526,442 and is used for projecting a scene in one colour on a projection screen. By superimposition of three differently coloured scenes on the projection screen, a colour picture, for example a colour television picture can be obtained. In the known projection lens system a third lens group in the form of a positive lens is arranged between the first and second lens groups. The second lens group comprises a plano-concave lens element commonly referred to as field curvature correction lens or "field flattener" which ensures that the so-called Petzval curvature of the two other lens groups is compensated for. The second lens group supplies substantially the entire power of the lens system and is therefore referred to as the main group. The most important function of the first lens group is to correct aberrations.

In an image projection system such as a color television projection system, it is desirable that the maximum possible amount of light supplied by the image source reaches the projection screen. To this end the projection lens system is required to receive the maximum possible amount of light from the image source, which means that this system must have a large numerical aperture and that it passes this light with a minimum attenuation. A projection television system further requires the overall length of this system to be as small as possible so that this system, possibly in a folded state, can be accommodated in a cabinet having dimensions acceptable for consumer uses. This means that the focal length of the projection lens system is to be as short as possible. Furthermore this lens system must illuminate a projection screen of maximum possible dimensions as uniformly as possible in order that a maximum possible picture of good quality is presented to the viewers. To achieve this the projection lens system must have a large field angle at the image end, particularly for correctly displaying the edges of the picture. This field angle is understood to mean the angle between the optical axis of the projection lens system and the central axis of a light beam directed towards the edge of the projection screen, which beam passes through the projection lens system with a still acceptable vignetting. This field angle is proportional to the quotient $$\frac{\text{half diagonal of the projection screen}}{\text{magnification} \times \text{focal length}}$$

The product in the denominator is also referred to as the image projection distance. This distance determines the required optical path length for the projection system.

In the projection lens system described in U.S. Pat. No. 4,526,442 a mirror bending the optical axis of the lens system over an angle of approximately 90° is arranged between the first lens group and the third lens group. While the length of the projection lens system is thereby reduced, the focal length is still relatively large. The first and third lens groups must be at a sufficiently large distance from each other for the mirror to be placed so that the projection lens system has a considerable vignetting. While vignetting can be reduced by enlarging the diameter of the first lens element, this is disadvantageous due to the required quantity of lens material and the weight of the lens element.

SUMMARY OF THE INVENTION

The present invention provides a projection lens system which is substantially free from aberrations and in which a short focal length is accompanied by a large field angle at the image end and which has a large numerical aperture. The length of the system and the diameter of the lens elements are reduced so that the weight of the system is acceptable.

The first lens group is constituted by a single lens element having, in addition to a first refractive surface facing the image end and a second refractive surface facing the object end, a third radiation-reflecting surface located between the first and the second surface. The pupil of the projection lens system is located within the first single lens element and the first refractive surface is an aspherical surface.

The location of the pupil within the first lens element allows locating the pupil in the first surface of this element. For certain uses a still acceptable result can be obtained if the pupil is located even slightly outside the first lens surface.

The first lens element may be referred to as a folded lens. The optical path length in this lens is equal to that in a lens which is twice as thick, but the volume and hence the weight is only half that of the thick lens. The reflecting surface of the first lens element fulfills the same function as the mirror in the projection lens system as in U.S. Pat. No. 4,526,442, namely changing the direction of the imaging beam so that the volume of the projection system can be reduced. Since the reflector in the first lens element is built in, it is not necessary to reserve space for such a reflector between the first and the second lens group so that the optical path length in the projection lens system is reduced and the vignetting of oblique beams due to limitations in the system is reduced and the diameter of the lens elements can remain limited. The first folded lens element, viewed from the image end, may form an intermediate image which has substantially no coma and astigmatism while in addition, with the field angle at the image end remaining equal, it reduces the field angle at the object end by a factor which is equal to the refractive index of the lens material. With the reduced field angle the further imaging towards the image source end with the beam, already rendered converging by the first lens element, can be established by means of a simple additional lens element or a plurality of such elements.

It has been found that satisfactory results are obtained if the first lens element is further characterized in that the aspherical surface, viewed from the image end, is convex in a zone around the optical axis and is concave outside said zone.

The second refractive surface of the first lens element maybe aspherical. The remaining aberration in the image formed can be reduced thereby.

A third lens group comprising a single bi-convex lens element may be arranged between the first and the second lens group so that this lens element supplies a part of the overall optical power of the projection lens system. Preferably the optical power of the third lens element is approximately equal to that of the first lens element.

By transferring a part of the power from the first lens element to the second lens element the design is improved as far as aberrations are concerned. The shape of the first lens element is then adapted, but the basic shape is maintained. The pupil of the projection lens system is then shifted slightly towards the object end but is still located in the first half of the first lens element, thus achieving a still considerable field angle reduction.

A first embodiment of this projection lens system is further characterized in that the refractive surface of the third lens element facing the image end is aspherical. This contributes to a reduction of the aberrations of the oblique beams in the projection lens system.

A second embodiment of this projection lens system is characterized in that the surfaces of the first and third lens elements facing the object ends are aspherical. This projection lens system thus has four aspherical surfaces.

The first lens element preferably consists of a glass lens substrate and an aspherical surface of this lens element is constituted by an aspherical outer profile of a layer of a transparent synthetic material which is provided on the glass lens substrate. The advantage of this embodiment of the first lens element is that this element is relatively insensitive to variations in ambient parameters such as temperature and humidity on the one hand, while on the other hand the aspherical surface can be provided on the lens element in a relatively simple way.

For the same reasons the second lens element preferably also consists of a glass lens substrate and an aspherical surface of this lens element is constituted by an aspherical outer profile of a layer of a transparent synthetic material which is provided on the glass lens substrate.

The third lens group preferably consists of a synthetic material lens element having a concave surface which is aspherical.

The invention also relates to a colour television projection system comprising three image sources each for one of the primary colours red, green and blue, a projection screen and three projection lens systems which are each arranged between one of the image sources and the projection screen. This system is characterized in that each projection lens system is a projection lens system as described above.

DETAILED DESCRIPTION OF THE PREFERRED EMBODIMENT

Figure 1:
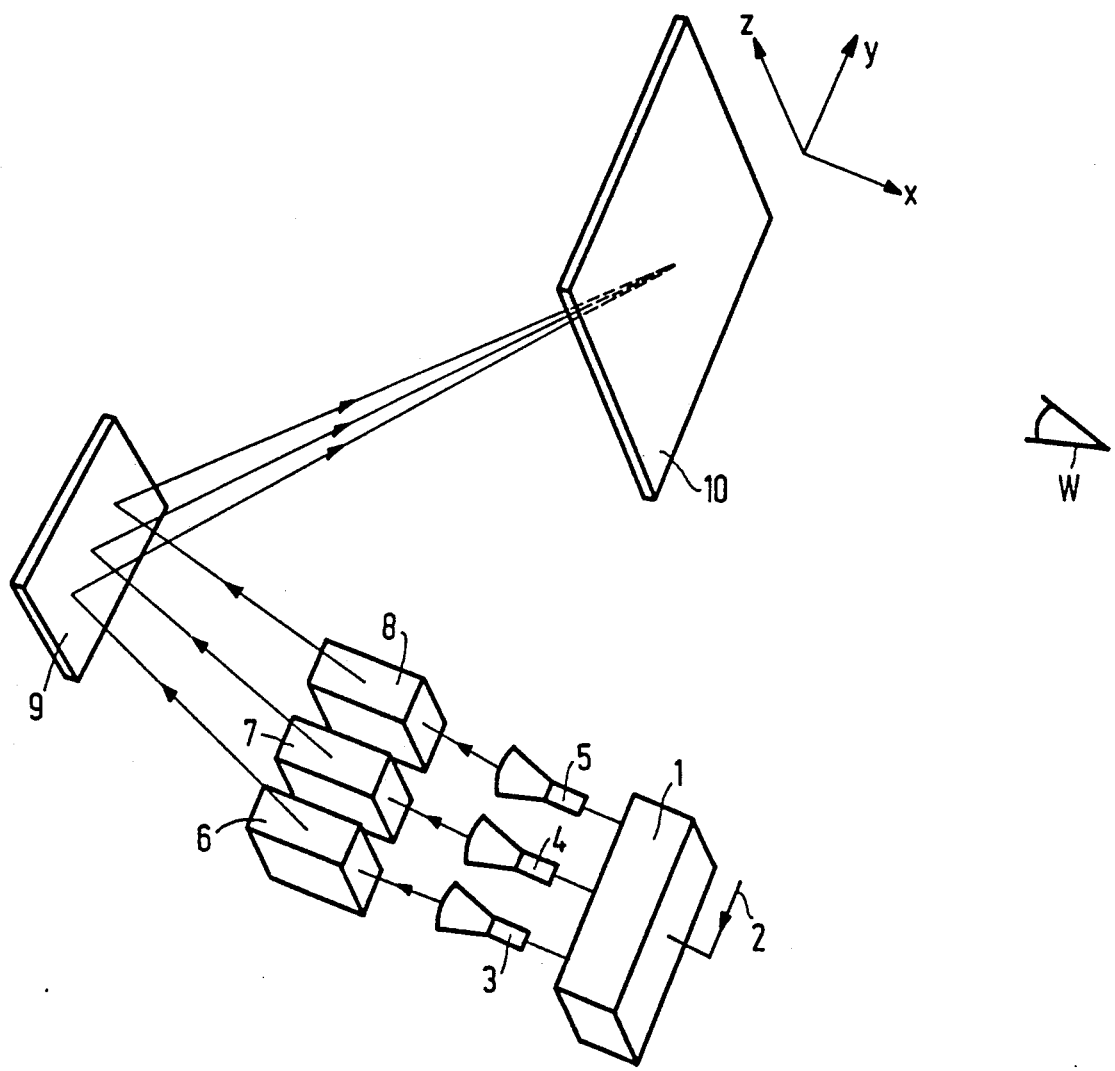
FIG. 1 is a diagrammatic perspective view of an embodiment of a colour television projection system having three projection lens systems according to the invention.

FIG. 1 shows a television receiver 1 having an input coupled to an antenna 2 to receive a color television signal which is split up into a red, a green and a blue signal. These signals are applied to three separate picture display devices, in this example three cathode ray tubes 3, 4 and 5 whose picture screens show a red, a green and a blue picture. These pictures are projected on a projection screen 10 by the projection lens system 6, 7 and 8 shown diagrammatically and associated with the separate tubes. For the sake of clarity only the chief rays of beams imaging a point of a display window on a point of the projection screen are shown. The radiation emitted by each display tube and passing through the associated projection lens system covers the entire projection screen 10. A mirror 9 reflecting the beams emerging from the projection lens systems to the projection screen is arranged between the projection lens systems and the projection screen. This mirror folds the radiation path so that the projection system can be accommodated in a cabinet having a relatively small depth without having to shorten the radiation path.

The three single-colour pictures must be superimposed on the projection screen. To this end the aligned display tubes are slightly bent towards each other, that is to say the normals on the screens of the tubes 3 and 5 extend at a small angle to the normal on the screen of the tube 4.

In the projection screen 10 the radiation of the three beams is dispersed over a relatively large angle in the Y-direction, that is to say in the horizontal direction for the viewer W, while in the Z-direction, the vertical direction for the viewer W, the radiation is dispersed through a smaller angle. The viewer W sees a picture which is the superimposition of the magnified pictures of the display tubes.

The monochrome pictures need not be supplied by cathode ray tubes but may alternatively be supplied by other picture display devices such as an electronically controlled flat display device built up from a matrix of picture cells, for example a liquid crystal display device or LCD which is irradiated by a broad light beam.

Each of the projection lens systems 3, 4 and 5 must image the scene of the picture screen of the associated tube on the projection screen with a high imaging quality, also at the edge of the picture. Such a projection lens system must have a high numerical aperture and the image distance associated with a given magnification must be preferably minimum. Furthermore the field angle at the image end must be as large as possible. The lens elements of the system must not be too large and too heavy and the number of elements must be as small as possible and yet the system should be corrected sufficiently for aberrations. The focal length of the overall system must be as small as possible and should not be dependent on variations in ambient parameters.

The present invention provides a novel class of projection lens systems in which the abovementioned partly contradictory requirements are met in an optimum way.

Figure 2:
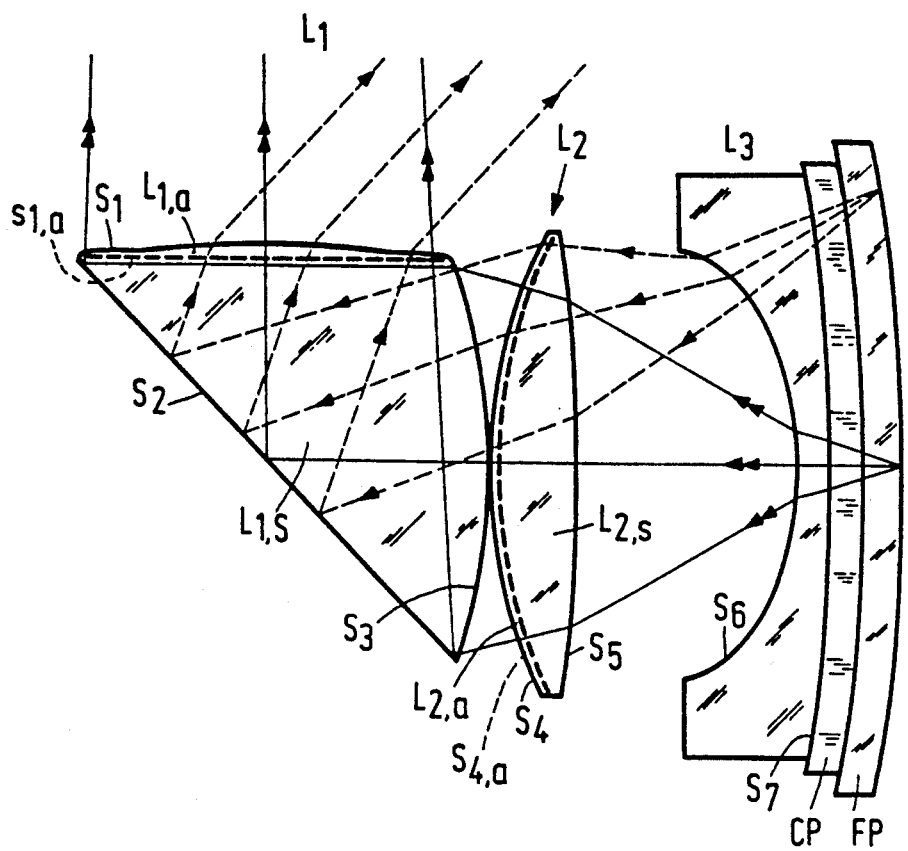
FIG. 2 shows an embodiment of such a projection lens system in a cross-section.

FIG. 2 shows a preferred embodiment of a projection lens system according to the invention drawn to scale. From the image end this system comprises a first lens group in the form of a folded lens element $L_1$, a third lens group comprising a biconvex lens element $L_2$ and a second lens group comprising a concave-convex lens element $L_3$, the field curvature correction lens or field flattener. The concave surface of the lens element $L_3$ is denoted by $S_6$. The curvature of the second surface $S_7$ of the lens element $L_3$ is adapted to that of the display window FP of the display tube which is not further shown. In the embodiment shown in FIG. 2 this display window and hence the surface $S_7$ is concave as viewed from the image end. The advantage of a curved display window is that the edges of the projection screen are better exposed because the angle between the chief ray of a beam originating from the edge of the display window and obliquely passing through the projection lens system and the normal on the display window is reduced by the curvature.

A plate-shaped holder CP may be arranged between the display window FP and the surface $S_7$ of the lens element $L_3$. A coolant comprising, for example water and glycol flows through this holder. Such a cooling is desired in view of the fact that the display tube must have a high brightness, so that without cooling the temperature of the luminescent material which is provided in the display screen behind the display window could increase considerably so that the brightness of the tube could decrease.

Figure 3:
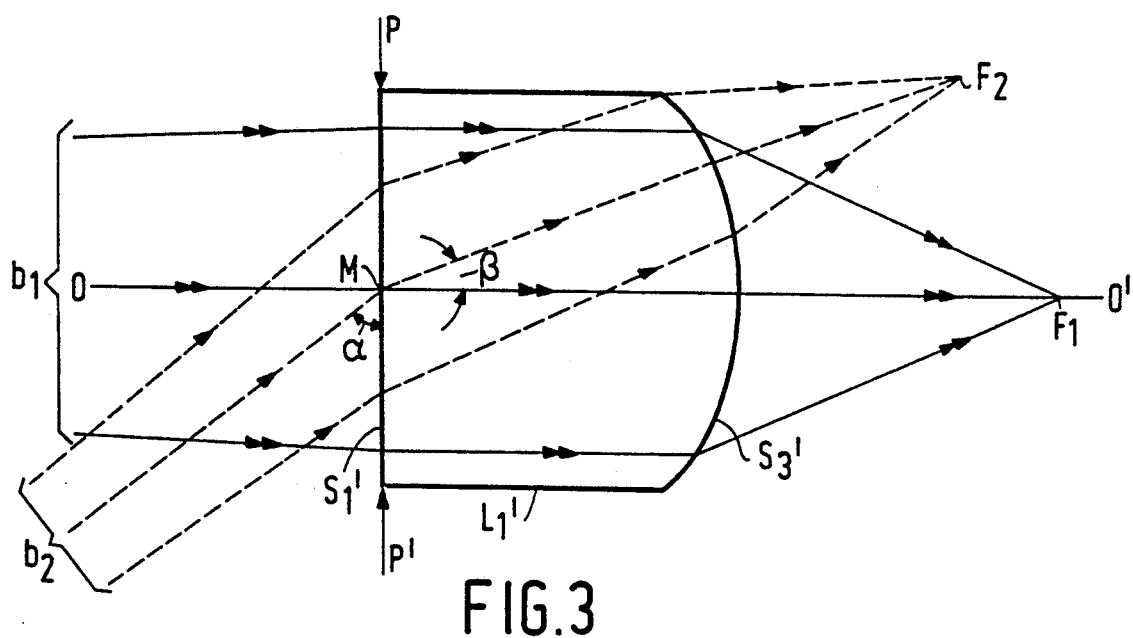
FIGS. 3, 4 and 5 show the basic shape and further forms of development of the projection lens system according to the invention as well as the radiation paths through these systems

The first lens element $L_1$ shown in FIG. 2 is the result of a novel concept in the design of projection lens systems. In this design the starting point is from a thick plano-convex lens $L_1'$ shown in FIG. 3 in which the centre of curvature M of the convex lens surface $S_3'$ is located on the flat surface $S_1'$. Although in the projection system the rays extend from right to left, the ray path in FIG. 3 is shown from left to right. This inversion is permitted in this type of optical systems and is used here because it simplifies the insight into the operation of the system. The beam $b_1$ shown in FIG. 3 is an imaginary beam which originates from the centre of the projection screen. Due to the relatively large distance between the lens element $L_1'$ and the projection screen the beam $b_1$ is only slightly diverging. This beam whose chief ray coincides with the optical axis OO' of the lens element $L_1'$ is converged in the point $F_1$ on the optical axis. The reference symbol $b_2$ denotes a likewise imaginary, slightly diverging beam which originates from the edge of the projection screen and passes through the lens element $L_1'$ with a still acceptable vignetting. The chief ray of this beam intersects the optical axis in the point M. For this lens element the pupil PP', the entrance pupil viewed from the projection screen, and the exit pupil viewed from the image source, is therefore located at the position of the first refractive surface $S_1'$ of the lens element $L_1'$. The chief ray of the beam $b_2$ is perpendicularly incident on the convex surface $S_3'$ and passes this surface without refraction. The peripheral rays of the beam $b_2$ are refracted towards the chief ray by the surface $S_3'$ so that the beam $b_2$ is focussed in the point $F_2$.

By using a lens element $L_1'$ in accordance with FIG. 3 in a projection system, it is achieved that the field angle at which the edge of the projection screen is viewed by the elements of the projection lens system located between the image source and this lens element is reduced. The field angle is the angle $\alpha$ at which the chief ray of the beam $b_2$ incident on the surface $S_1'$ intersects the optical axis. After refraction by this surface this chief ray extends at an angle $\beta$ to the optical axis. The field angle reduction is given by $$\frac{\sin \beta}{\sin \alpha} = \frac{n_1}{n_2}$$

wherein $n_2$ is the refractive index of the lens material and $n_1$ is that of the surrounding medium. If this medium is air for which $n_1 = 1$, the field angle is reduced by a factor which is approximately equal to $n_2$.

Figure 4:
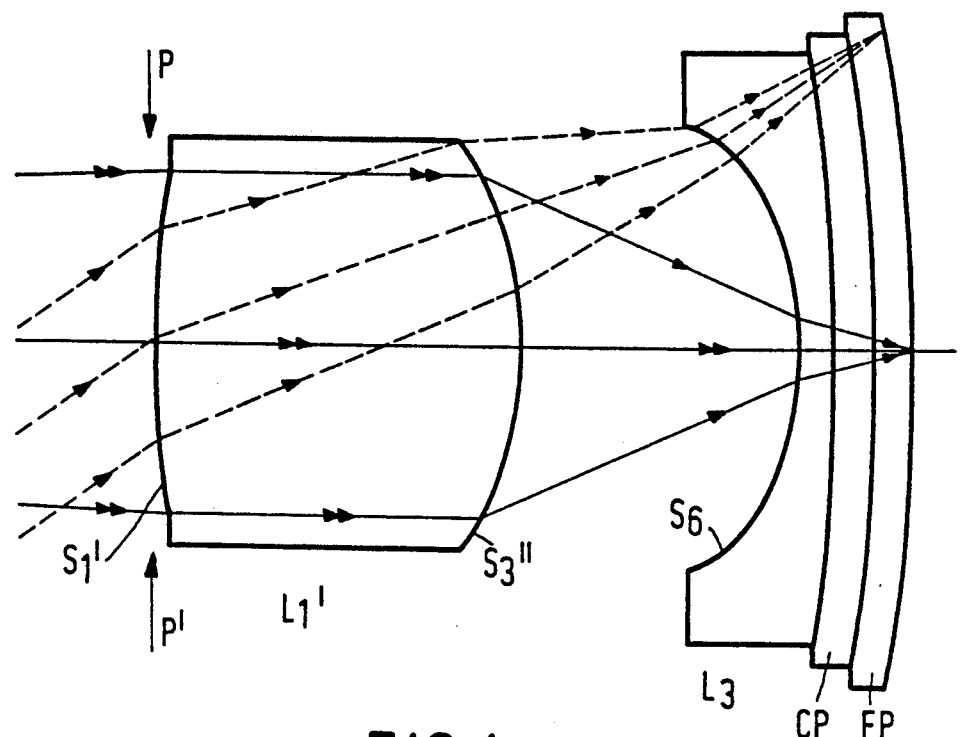

For this reduced field angle and the convergence of the beams brought about by the lens element $L_1'$ the further imaging may be realized with only several simple additional lens elements. In certain uses it would be sufficient to use only the concave lens $L_3$ of FIG. 2. FIG. 4 shows an embodiment of a projection lens system having only the thick lens $L_1'$ and the concave lens $L_3$.

The lens $L_1'$ may form an intermediate image which is diagrammatically shown in FIG. 3 by the points $F_1$ and $F_2$, which image has substantially no coma and astigmatism but is still beset with spherical aberration. This aberration may be reduced by giving the first surface $S_1$ of the lens element $L_1'$ an aspherical shape. Preferably this surface is convex in a zone around the optical axis and concave outside this zone, as is shown in FIG. 4. In order to realize a further reduction of aberrations, the second surface $S_3''$ of the lens element $L_1'$ may also be aspherical. Since also the concave surface $S_6$ of the lens element $L_3$ is aspherical, the projection lens system of FIG. 4 totals three aspherical surfaces. This system may have a focal length of 78 mm and a numerical aperture at the object end of 0.30 to 0.35.

Figure 5:
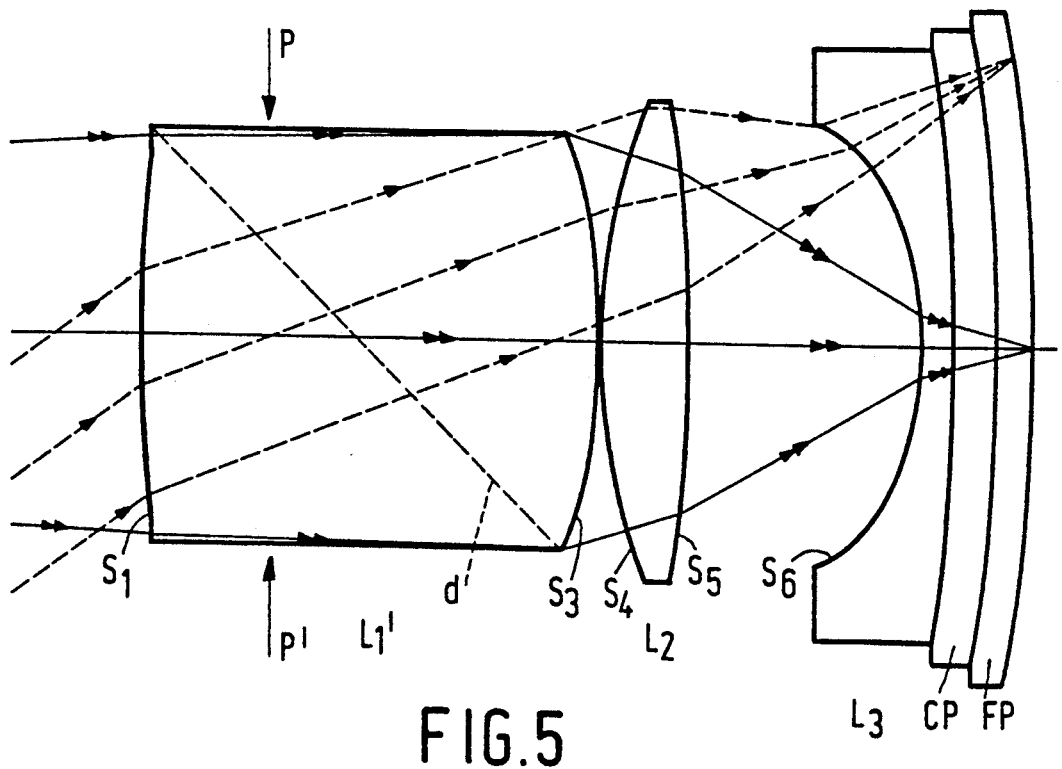

A considerable increase of the numerical aperture and a reduction of aberrations at the same focal length can be obtained by adding a third biconvex lens element. Such a projection lens system, which is not only extremely suitable for projecting present-day television images but also for projecting future high-definition television images, is shown in FIG. 5. The optical power of the projection lens system is now distributed over the first thick lens element $L_1$ and the third lens element $L_2$ These lens elements preferably have approximately the same optical powers. To this end the lens element $L_1$ is slightly adapted but its basic shape has been maintained. The pupil PP' of the system is shifted slightly to the object end but is still located fairly close to the first refractive surface $S_1$ so that the field angle reduction is comparable to that which is obtained in the systems according to FIGS. 3 and 4. If the surfaces $S_1$, $S_4$ and $S_6$ are aspherical surfaces, a numerical aperture of more than 0.40 at a focal length of 78 mm can be realized.

The lens element $L_1'$ in FIGS. 3 and 4 is a thick glass lens element and is thus relatively costly and heavy. As already shown in FIG. 5, the projection lens system is designed in such a way that this lens element becomes even slightly thicker so that a diagonal plane d can be provided through the lens element. By leaving out the lens material under this plane, rendering the surface at the location of this plane reflective and providing the surface $S_1$ on the upper side of the lens element, a folded lens element ($L_1$ in FIG. 2) is obtained which exhibits the same behaviour as the lens element $L_1'$ of FIG. 5. The folded lens element has the advantage that is requires half the quantity of optically high-grade lens material needed for the lens element $L_1'$ of FIG. 5 so that the folded lens element is considerably lighter and less costly. Besides the surface $S_2$ reflects the projection beam in a direction which is optimum for further folding the radiation path in the projection system.

The surface $S_2$ of the lens element $L_1$ may be rendered reflective by providing a silver layer, for example by means of vapour deposition.

Also in the projection lens system of FIG. 4, having only two lens elements, the first lens element may be replaced by a folded lens element. This projection lens system preferably comprises three aspherical surfaces $S_1'$, $S_3'$ and $S_6$.

In the embodiments of FIGS. 2 and 5 the lens surfaces $S_1$, $S_4$ and $S_6$ may be aspherical.

The optical behaviour of the lens elements $L_1$ and $L_2$, which determine the optical power and the focal length of the projection lens system, must be independent of variations in temperature or humidity of the surrounding medium. On the other hand these lens elements must have aspherical surfaces which are difficult to realize in glass. Therefore these lens elements preferably consist of glass substrates $L_{1,s}$ and $L_{2,s}$ on the aspherical sides of which thin layers $L_{1,a}$ and $L_{2,a}$ of a transparent synthetic material with aspherical outer profiles $S_1$ and $S_4$, respectively are provided. $S_{1,a}$ and $S_{2,a}$ are the inner surfaces of the thin layers $L_{1,a}$ and $L_{2,a}$, respectively. Since the layers are only thin, a variation of the refractive index or of the shape of these layers as a result of variations in the ambient parameters has only a slight effect on the behaviour of the lens elements as a whole.

Figure 6:
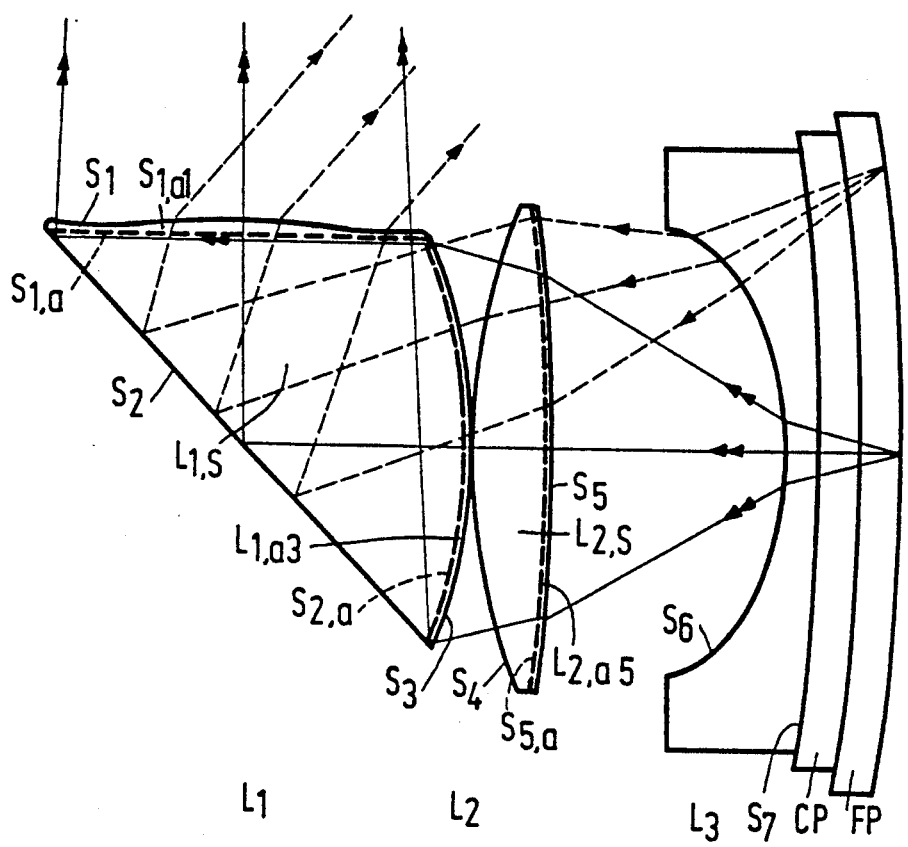
FIG. 6 shows a further embodiment of the projection lens system.

FIG. 6 shows a further embodiment of the projection lens system according to the invention. This system has four instead of three aspherical surfaces, namely the surfaces $S_1$, $S_3$, $S_5$ and $S_6$. As in the system of FIG. 2, the lens elements $L_1$ and $L_2$ may consist of glass lens substrates $L_{1,s}$ and $L_{2,s}$ on the aspherical sides of which thin layers $L_{1,a1}$, $L_{1,a3}$ and $L_{2,a5}$ of a transparent synthetic material with aspherical outer profiles $S_1$, $S_3$ and $S_5$ are provided. By providing the projection lens system with four aspherical surfaces, a glass of lower cost and having a lower refractive index can be used for the lens elements $L_1$ and $L_2$.

The aspherical layers may be provided on the lens substrates by means of a so-called replica process. In this process use is made of moulds having inner profiles which are the reverse of the desired outer profiles of the layers to be formed. A transparent synthetic material brought to a sufficiently soft condition, for example, a synthetic material which can be polymerized by ultraviolet radiation is provided on a lens substrate whereafter a mould is pressed into it. Subsequently the synthetic material is cured, for example by irradiation by ultraviolet light and the mould is removed the lens becoming available without any further processing operations being required.

The correcting lens element $L_3$ may entirely consist of a synthetic material, for example, polymethylmethacrylate (PMMA) or polycarbonate (PC). The aspherical profile on the surface $S_6$ may already be provided during moulding of the lens element by making use of a mould having an aspherical profile. It is alternatively possible to provide the aspherical profile after forming the lens element $L_3$ by means of the replica process.

The aspherical surfaces, for example, $S_1$, $S_4$ and $S_6$ of FIGS. 2 and 5 may be characterized by $$Z = \sum_{i=1}^{6} a_{2i} Y^{2i}$$

wherein Y is the distance between a point on the aspherical surface and the optical axis of the lens element and Z is the distance between the projection of this point on the optical axis and the point of intersection of the optical axis with the aspherical surface.

The following values apply, from the image end, to the axial surface curvatures C, the axial distances di between these surfaces and the refractive indices n for an embodiment of the projection lens system according to FIG. 2 in which the lens element $L_1$ consists of glass of the type number $SF_2$ from Schott and the lens element $L_2$ as well as the lens element $L_3$ consists of polycarbonate, whose focal lenth is 78 mm and the numerical aperture is 0.425.

|  |  | C (mm$^{-1}$) | di (mm) | n |
|---|---|---|---|---|
| $L_1$ | $S_1$ | 0.005679 | | |
|  |  |  | 84.00 | 1.654 |
|  | $S_3$ | −0.009203 | | |
|  |  |  | 0.100 | |
|  | $S_4$ | 0.007552 | | |
| $L_2$ |  |  | 16.00 | 1.573 |
|  | $S_5$ | −0.003645 | | |
|  |  |  | 45.48 | |
|  | $S_6$ | −0.015772 | | |
|  |  |  | 5.00 | 1.573 |
|  | $S_7$ | −0.028571 | | | whilst the aspherical coefficients $a_{2i}$ of the surfaces $S_1$, $S_4$ and $S_6$ are equal to

| | | |
|---|---|---|
| $S_1$ | $a_2 =$ | $0.283935 \times 10^{-2}$ |
| | $a_4 =$ | $-0.390136 \times 10^{-6}$ |
| | $a_6 =$ | $-0.750233 \times 10^{-9}$ |
| | $a_8 =$ | $0.839881 \times 10^{-12}$ |
| | $a_{10} =$ | $-0.564121 \times 10^{-15}$ |
| | $a_{12} =$ | $0.142924 \times 10^{-18}$ |
| $S_4$ | $a_2 =$ | $0.377615 \times 10^{-2}$ |
| | $a_4 =$ | $0.301339 \times 10^{-6}$ |
| | $a_6 =$ | $0.243433 \times 10^{-9}$ |
| | $a_8 =$ | $-0.190848 \times 10^{-12}$ |
| | $a_{10} =$ | $0.873343 \times 10^{-16}$ |
| | $a_{12} =$ | $-0.138625 \times 10^{-19}$ |
| $S_6$ | $a_2 =$ | $-0.788596 \times 10^{-2}$ |
| | $a_4 =$ | $-0.486486 \times 10^{-5}$ |
| | $a_6 =$ | $0.201054 \times 10^{-8}$ |
| | $a_8 =$ | $-0.821263 \times 10^{-12}$ |
| | $a_{10} =$ | $0.192444 \times 10^{-15}$ |
| | $a_{12} =$ | $-0.140404 \times 10^{-19}$ |

The following values apply, from the image end, to the axial surface curvatures C, the axial distances di between these surfaces and the refractive indices n for an embodiment of the projection lens system according to FIG. 6 in which the lens elements $L_1$ and $L_2$ consist of a glass having a refractive index n=1.523 and the lens element $L_3$ consists of polycarbonate, whose focal length is 78 mm and the numerical aperture is 0.425.

|  |  | C (mm$^{-1}$) | di (mm) | n |
|---|---|---|---|---|
| $L_1$ | $S_1$ | 0.006208 | | |
|  |  |  | 79.00 | 1.523 |
|  | $S_3$ | −0.010825 | | |
|  |  |  | 0.00 | |
|  | $S_4$ | 0.009310 | | |
| $L_2$ |  |  | 19.00 | 1.523 |
|  | $S_5$ | −0.003699 | | |

-continued

| | C (mm$^{-1}$) | di (mm) | n |
|---|---|---|---|
| | | 47.61 | |
| | S$_6$ −0.016092 | | |
| L$_3$ | | 5.00 | 1.573 |
| | S$_7$ −0.002857 | | | whilst the aspherical coefficients $a_{2i}$ of the surfaces $S_1$, $S_3$, $S_5$ and $S_6$ are equal to

| | | |
|---|---|---|
| $S_1$ | $a_2 =$ | $0.310383 \times 10^{-2}$ |
| | $a_4 =$ | $-0.105215 \times 10^{-5}$ |
| | $a_6 =$ | $0.400580 \times 10^{-9}$ |
| | $a_8 =$ | $-0.490024 \times 10^{-12}$ |
| | $a_{10} =$ | $0.175177 \times 10^{-15}$ |
| | $a_{12} =$ | $-0.128466 \times 10^{-19}$ |
| $S_3$ | $a_2 =$ | $-0.541266 \times 10^{-2}$ |
| | $a_4 =$ | $0.226953 \times 10^{-6}$ |
| | $a_6 =$ | $-0.920401 \times 10^{-9}$ |
| | $a_8 =$ | $0.947392 \times 10^{-12}$ |
| | $a_{10} =$ | $-0.453133 \times 10^{-15}$ |
| | $a_{12} =$ | $0.893888 \times 10^{-19}$ |
| $S_5$ | $a_2 =$ | $-0.184919 \times 10^{-2}$ |
| | $a_4 =$ | $-0.272621 \times 10^{-6}$ |
| | $a_6 =$ | $-0.944855 \times 10^{-10}$ |
| | $a_8 =$ | $-0.267133 \times 10^{-14}$ |
| | $a_{10} =$ | $-0.402639 \times 10^{-17}$ |
| | $a_{12} =$ | $0.249263 \times 10^{-20}$ |
| $S_6$ | $a_2 =$ | $-0.804603 \times 10^{-2}$ |
| | $a_4 =$ | $-0605556 \times 10^{-5}$ |
| | $a_6 =$ | $0.327394 \times 10^{-8}$ |
| | $a_8 =$ | $-0.157108 \times 10^{-11}$ |
| | $a_{10} =$ | $0.438393 \times 10^{-15}$ |
| | $a_{12} =$ | $-0.341239 \times 10^{-19}$ |

Using the inventive idea, a similar projection lens system may be alternatively designed for a cathode ray tube having a flat display window or for image sources other than cathode ray tubes, such as a liquid crystal display device. Besides, the invention may also be used in projectors other than colour television projectors, such as a projector for projecting, for example a black-green image in which a reduction of the volume is aimed at.

What is claimed is:

1. A projection lens system for projecting in an image space an image from an image source present in an object space, which lens system comprises from the image end successively a first, positive lens group and at least a second, negative lens group whose surface facing the image end is concave, characterized in that the first lens group is constituted by a single lens element having, in addition to a first refractive surface facing the image end and a second refractive surface facing the object end, a third radiation-reflecting surface located between the first and the second surface, in that the pupil of the projection lens system is located within the first single lens element and in that the first refractive surface is an aspherical surface.

2. A projection lens system as claimed in claim 1, characterized in that the aspherical surface of the first lens element, viewed from the image end, is convex in a zone around the optical axis and is concave outside said zone.

3. A projection lens system as in claim 1 wherein second refractive surface of the first lens element is aspherical.

4. A projection lens system as in claim 1 wherein a third lens group comprising a single bi-convex lens element is arranged between the first and the second lens group and in that said lens element supplies a part of the overall optical power of the projection lens system.

5. A projection lens system as claimed in claim 4, characterized in that the optical power of the third lens element is approximately equal to that of the first lens element.

6. A projection lens system as in claim 4 wherein the refractive surface of the third lens element facing the image end is aspherical.

7. A projection lens system as claimed in claim 5, characterized in that the surfaces of the first and third lens elements facing the object ends are aspherical.

8. A projection lens system as in claim 1 wherein the first lens element consists of a glass lens substrate and in that an aspherical surface of said lens element is constituted by an aspherical outer profile of a layer of a transparent synthetic material which is provided on the glass lens substrate.

9. A projection lens system as in claim 1 wherein the second lens element consists of a glass lens substrate and in that an aspherical surface of said lens element is constituted by an aspherical outer profile of a layer of a transparent synthetic material which is provided on the glass lens substrate.

10. A projection lens system as in claim 1 wherein the third lens group consists of a synthetic material lens element having a concave surface which is aspherical.

* * * * *